(12) United States Patent
Fabrykowski et al.

(10) Patent No.: US 8,175,438 B2
(45) Date of Patent: May 8, 2012

(54) MODULAR SEPARATING BOX FOR LIGHT GUIDES AND A SYSTEM OF MODULAR SEPARATING BOXES FOR LIGHT GUIDES

(75) Inventors: Grzegorz Fabrykowski, Strykow (PL); Grzegorz Konrad Gralewski-Sek, Lodz (PL); Robert Tomasz Klak, Zdunska Wola (PL); Joanna Maria Polus, Lodz (PL); Bartlomiej Sokolowski, Trybunalski (PL); Grzegorz Tosik, Buczek (PL)

(73) Assignee: CCS Technology, Inc., Wilmington, DE (US)

( * ) Notice: Subject to any disclaimer, the term of this patent is extended or adjusted under 35 U.S.C. 154(b) by 326 days.

(21) Appl. No.: 12/291,105

(22) Filed: Nov. 6, 2008

(65) Prior Publication Data

US 2009/0116807 A1    May 7, 2009

(30) Foreign Application Priority Data

Nov. 6, 2007    (PL) .......................................... 383706

(51) Int. Cl.
*G02B 6/00*    (2006.01)
(52) U.S. Cl. ........................................ 385/135; 385/147
(58) Field of Classification Search .................... 385/78, 385/129–141, 147
See application file for complete search history.

(56) References Cited

U.S. PATENT DOCUMENTS

| | | | | |
|---|---|---|---|---|
| 4,630,886 A | * | 12/1986 | Lauriello et al. | 385/135 |
| 5,071,211 A | | 12/1991 | Debortoli et al. | 385/76 |
| 5,167,001 A | | 11/1992 | Debortoli et al. | 385/135 |
| 5,274,731 A | * | 12/1993 | White | 385/135 |
| 5,823,646 A | * | 10/1998 | Arizpe et al. | 312/324 |
| RE37,489 E | * | 1/2002 | Anton et al. | 385/53 |
| 7,496,268 B2 | * | 2/2009 | Escoto et al. | 385/134 |
| 7,499,622 B2 | * | 3/2009 | Castonguay et al. | 385/135 |
| 2001/0036351 A1 | | 11/2001 | Fritz | 385/135 |
| 2005/0100301 A1 | * | 5/2005 | Solheid et al. | 385/135 |
| 2005/0163448 A1 | * | 7/2005 | Blackwell et al. | 385/135 |
| 2006/0008231 A1 | | 1/2006 | Reagan et al. | 385/135 |

FOREIGN PATENT DOCUMENTS

| | | |
|---|---|---|
| DE | 19639889 C2 | 1/2000 |
| DE | 202007000556 U1 | 11/2007 |
| EP | 0996206 B1 | 11/2006 |

OTHER PUBLICATIONS

Corning Cable Systems, EVO-117-EN, "Wall-Mountable Closet Housings: WCH-06P, WCH-04P and WCH-02P," May 2002, 2 pages.
Corning Cable Systems, EVO-118-EN, "Wall-Mountable Closet Housings: WCH-12P and WCH-08P," May 2002, 2 pages.

(Continued)

*Primary Examiner* — Akm E Ullah
(74) *Attorney, Agent, or Firm* — John H. Vynalek

(57) ABSTRACT

A modular separating box for light guides having a receiving chamber, and/or a sending chamber, and/or a connection chamber enclosed by individual doors is disclosed. The modular separating box has at least one wall with at least one movable plate. The modular separating box also has at least one connection panel that forms a wall of the receiver and/or sending chamber, where fastening elements for joining one modular separating box with successive modular separating boxes for creating a modular arrangement of modular separating boxes are located on the upper and/or lower and/or side surfaces of the box housing. The system of modular separating boxes for light guides contains a set of interconnected modular separating boxes.

18 Claims, 9 Drawing Sheets

OTHER PUBLICATIONS

Corning Cable Systems, EVO-583-EN, "Wall-Mountable Fiber-to-the-Business Premises Interconnect Center (WIC)," Aug. 205, 4 pages.
Corning Cable Systems, EVO-727-EN, "Evolant® Solutions Multidwelling Unit Engineering and Design Guide," Jul. 2007, 46 pages.
Corning Cable Systems, LAN-570-EN, "Wall Mountable Interconnect Centers (WIC)," Apr. 2009, 2 pages.
Siecor, P0737489, "Compact Series Three Position Shelf, Installation and Maintenance Documentation Package," Mar. 1999, 85 pages.
Corning Cable Systems, SRP-003-439, "Wall Mount Kit," Issue 3, Jan. 2001, 2 pages.
Siecor, SRP-003-472, "CCB-04P Four-Panel Connector Column Box," Issue 1, Feb. 1998, 6 pages.
Siecor, SRP-209-200, "Optical Outdoor Network Unit (ONU) Installation," Issue 2, Mar. 1998, 13 pages.
Corning Cable Systems, "MTX Frames and Accessories," Feb. 2006, 4 pages.
Corning Cable Systems, "Rack-Mountable Closet Connector Housings," 2002, 2 pages.
Corning Cable Systems, SRP-003-340, Wallmount Building Terminal (WBT), Issue 8, Apr. 2006, 12 pages.

* cited by examiner

MODULAR SEPARATING BOX FOR LIGHT GUIDES AND A SYSTEM OF MODULAR SEPARATING BOXES FOR LIGHT GUIDES

CROSS-REFERENCE TO RELATED APPLICATIONS

This application claims benefit of priority under 35 U.S.C. §119 of Polish Patent Application No. P-383706 filed on Nov. 6, 2007, the content of which is relied upon and incorporated herein by reference in its entirety.

BACKGROUND

1. Technical Field

The present invention relates generally to a modular separating box for light guides and a system of modular separating boxes for light guides, designed for the rapid connection of light guide courses.

2. Technical Background

There are many solutions for light guide-separating boxes on the market from various manufacturers.

A walled light guide separating box as described in U.S. Patent Application Publication No. 2001/036351 is known. It has a metal housing basically having perpendicular walls comprised of side, upper, lower and rear walls, as well as a first front cover for closing the chamber of incoming light guides and a second front cover for closing the chamber of outgoing light guides. Both chambers located inside the housing are separated by a panel connected basically parallel to the side wall and extending between the upper and lower walls. The first cover is connected to the side wall by hinges so that it is perpendicular to the side wall in the closed state. The second front cover is connected by hinges to the rear wall so that in the closed state it forms a second side wall opposite the first side wall, and the front wall is an elongation of the first cover. The covers can be connected in other implementation examples to the housing without hinges with the aid of latches or clips.

A walled light guide separating box as described in U.S. Pat. No. 5,823,646 is also known. It has a housing containing a rear panel, upper, lower and side walls and front doors that open downward and two side doors on both sides of the front doors that open to the side. The side doors are latched on the front doors such that the opening of the front doors simultaneously causes the side doors to open.

Another separating box solution known from the prior art is the housing represented in utility model No. PL53218, which has a perpendicular-walled shape containing elements fastened rotatably. The housing has a rotatably mounted cover that is the front movable wall. The covers are fastened on the inside with holders to steel connectors. In addition, inside the covers/doors there is a free space constituting a container for storage of light guides, fastened with cable holders. A bracket having holes for turning the separation connectors and a set of connection clips for controlling the cables introduced into the housing and going out of the housing are provided.

However, there is no solution that would take into account the possibility of using a walled modular separating box for light guides, utilized by several different operators and offering the possibility for each operator to have sole access to a separate modular separating box, and access with other operators to a common modular separating box. The solution according to the invention assures expansion of the separating box in both directions, from both the receiving and sending sides.

SUMMARY OF THE DETAILED DESCRIPTION

A modular separating box for light guides containing a housing with chambers, a connection panel, and a small mounted doors in accordance with the invention comprising a receiving chamber, and/or a sending chamber, and/or a connection chamber, enclosed by individual doors. The modular separating box has at least one wall with at least one movable plate, and at least one connection panel, which forms a wall of the receiving chamber and/or sending chamber. The modular separating box comprises fastening elements for connecting one modular separating box to successive modular separating boxes to form a modular arrangement of modular separating boxes, wherein the fastening elements are placed on the upper surface, and/or lower surface and/or side surface of the modular separating box housing.

The modular separating box housing is perpendicular-walled, and the movable plate is the lower wall and/or upper wall and/or the side wall. The connection panel constitutes an element of the external wall of the modular separating box or an element delimiting the pitch plane of the box on the sending and/or receiving and/or connection plane. Preferably, the connection panel constitutes the bracket of the panel of adapters or the cover of the light guide cable. In addition, the connection panel is connected rotatably to the rear wall.

The receiving and/or connection chamber is connected to at least one sending chamber. In addition, the connection chamber constitutes a part or all of the receiving chamber.

The doors are connected in an articulated manner to the receiving and sending chambers.

The chamber doors have edges with the connecting elements that permit forming a common surface.

The modular separating box is preferably a walled box.

The system of modular separating boxes for light guides according to the invention comprises a set of interconnected modular separating boxes connected to each other involving sending chambers, and/or receiving chambers and/or connection chambers, having at least one movable wall for further connections including at least one movable plate, in which the connection panel forms a wall of the receiving chamber and/or sending chamber. Fastening elements are located on the surfaces of the box housing for connecting one modular separating box to subsequent modular separating boxes for creating a modular arrangement of separating boxes, in which case the system contains at least one sending chamber and at least one receiving chamber and/or connection chamber.

The system preferably contains at least one sending chamber and one receiving chamber. The sending chambers are located inside and/or below and/or above and/or around the receiving chamber. In addition, the connection chamber constitutes part or all of the receiving chamber.

In a preferable implementation variant the system of modular separating boxes for light guides has separate spaces for storage of light guide cables.

BRIEF DESCRIPTION OF THE FIGURES

The object of the invention is presented in the implementation examples in the figures, in which the axonometric views show.

DETAILED DESCRIPTION

Figure 1:
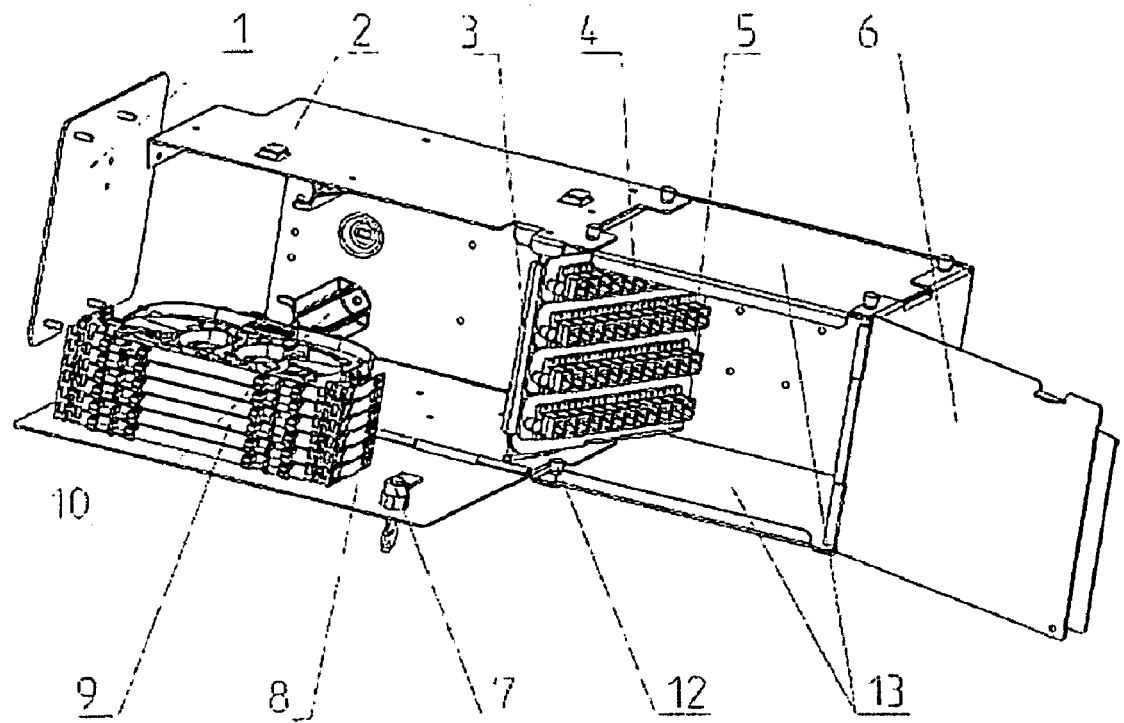
FIG. 1—the inside of the modular separating box with a receiving chamber in a first implementation example with a panel bracket.
Figure 2:
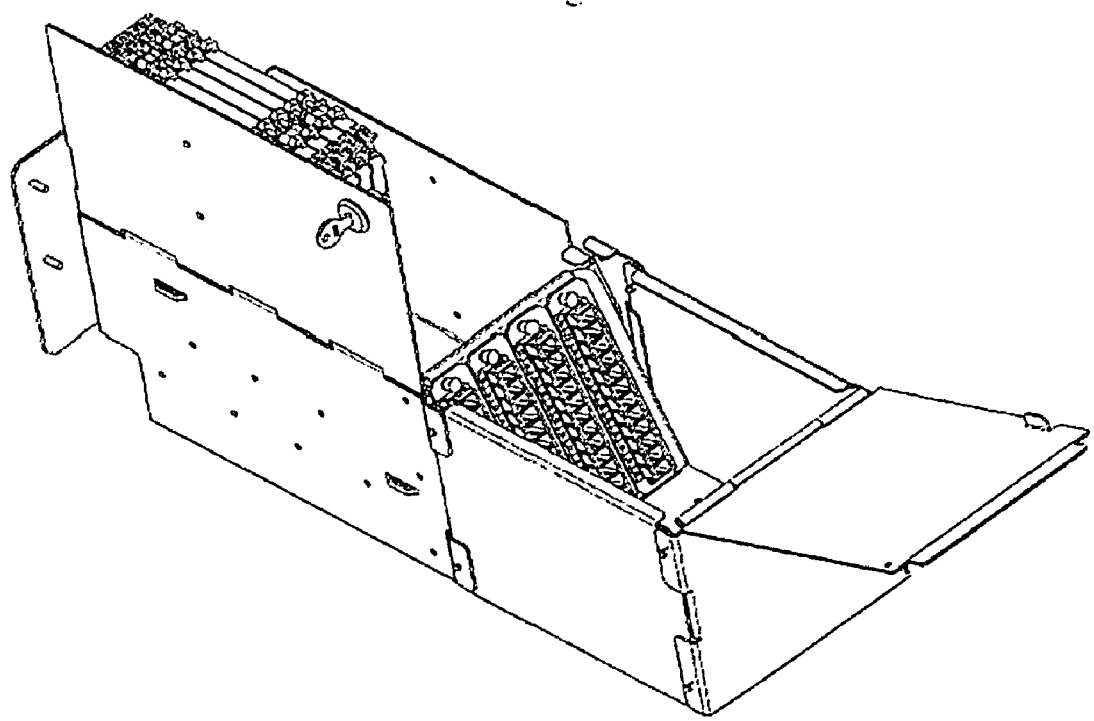
FIG. 2—the lower surface of the modular separating box with a receiving chamber in a first implementation example with a panel bracket.
Figure 3:
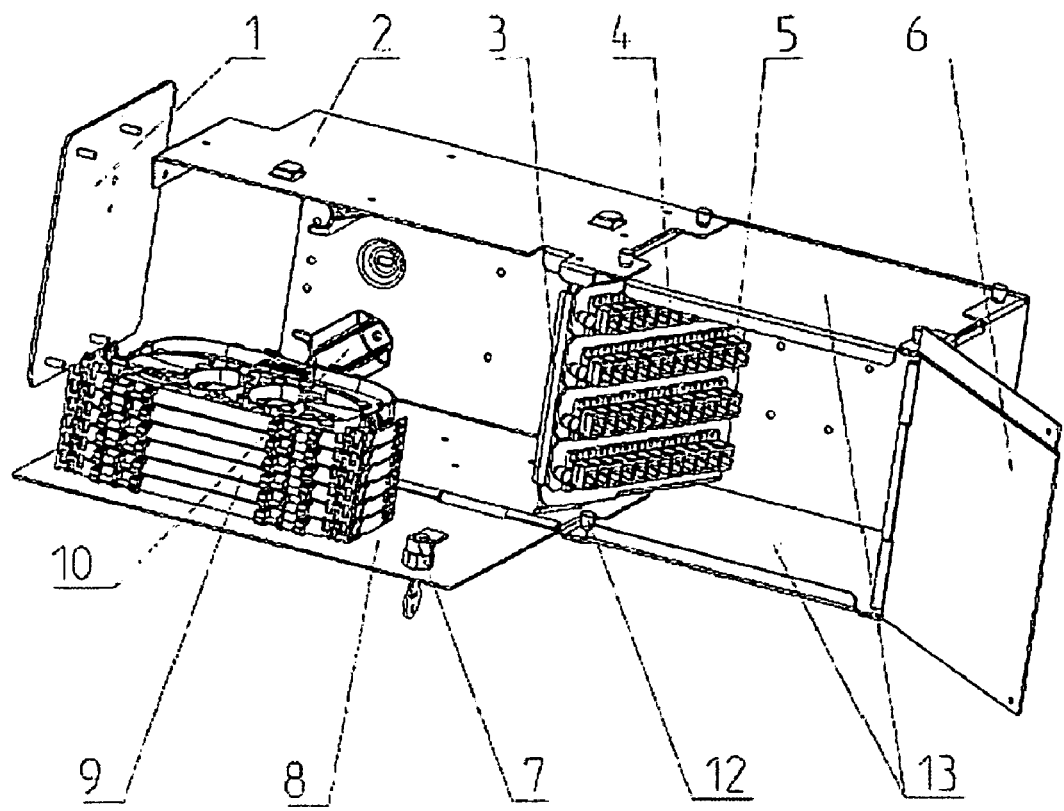
FIG. 3—the inside of the modular separating box with a sending chamber in a first implementation example with a panel bracket.
Figure 4:
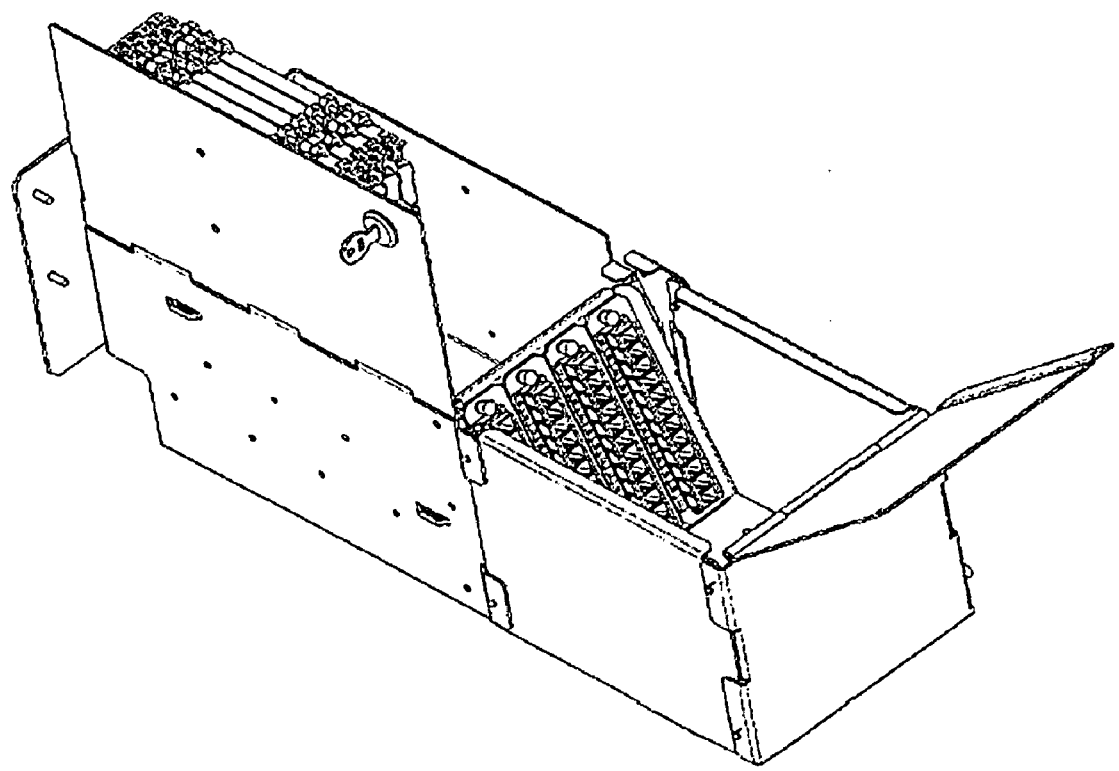
FIG. 4—the lower surface of the modular separating box with a sending chamber in a first implementation example with a panel bracket.
Figure 5:
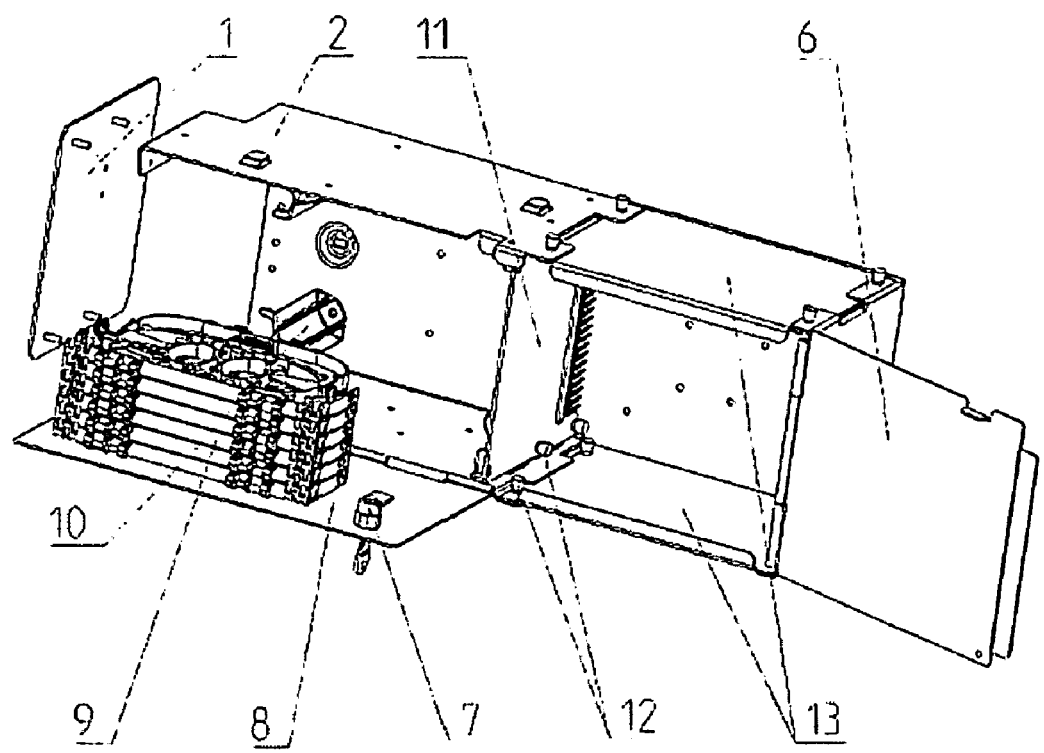
FIG. 5—the inside of the modular separating box with a receiving chamber in a first implementation example with the cover of the light guide cables.
Figure 6:
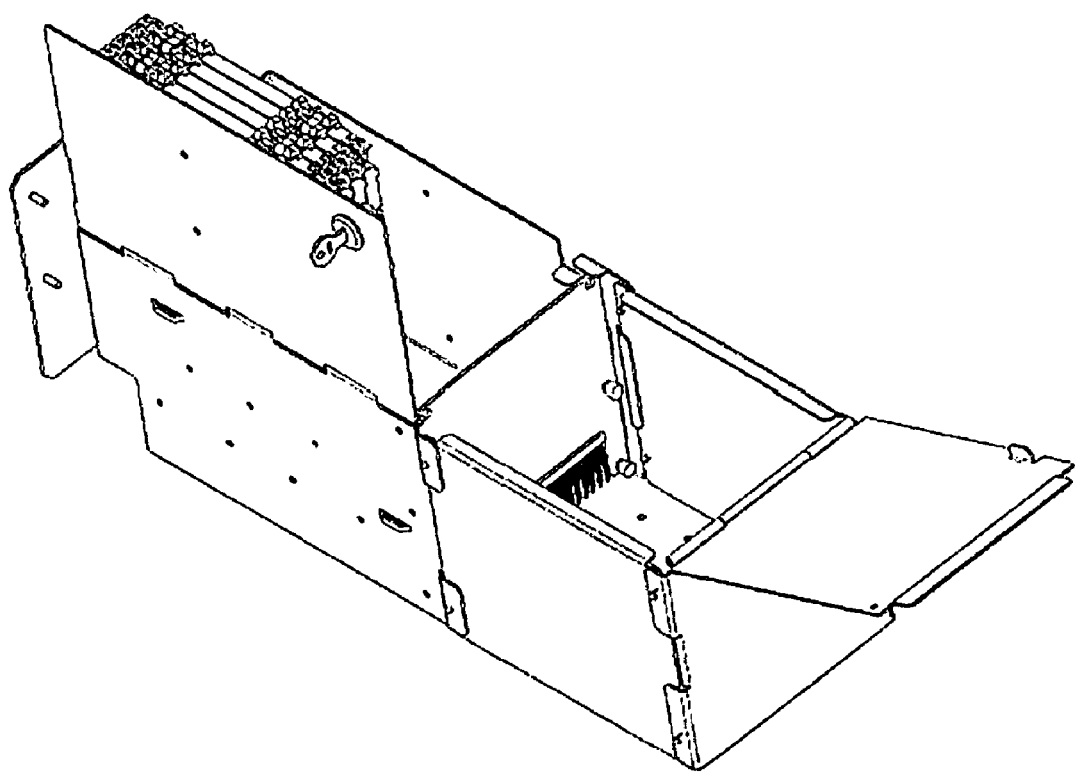
FIG. 6—the lower surface of the modular separating box with a receiving chamber in a first implementation example with the cover of the light guide cables.
Figure 7:
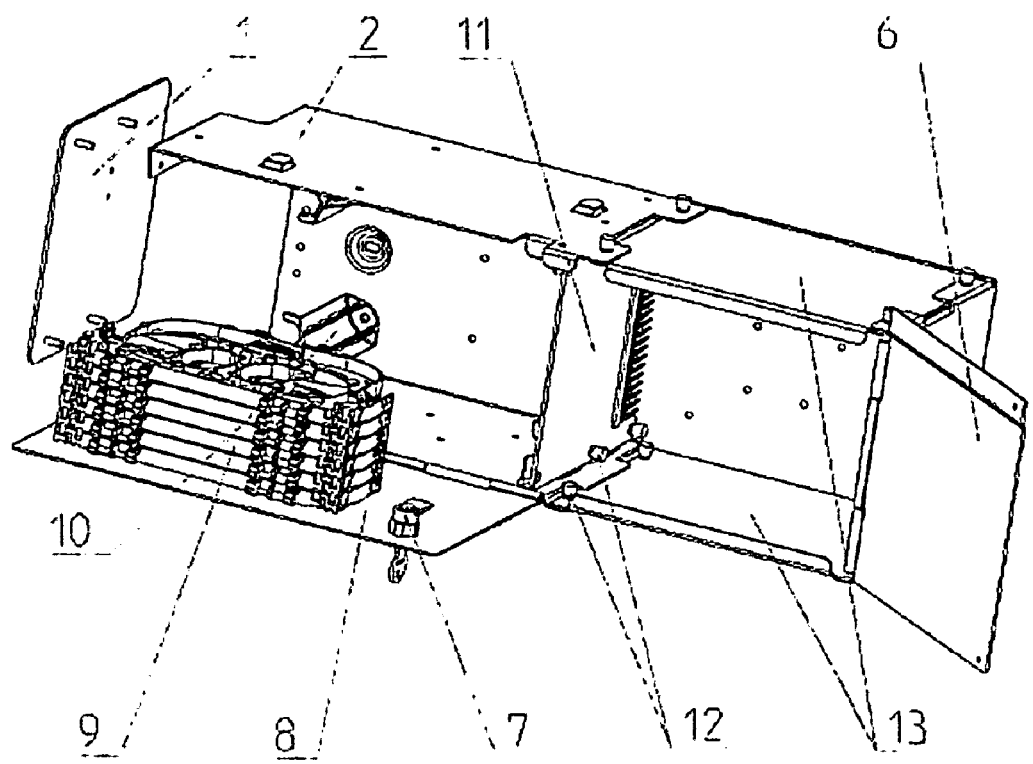
FIG. 7—the inside of the modular separating box with a sending chamber in a first implementation example with the cover of the light guide cables.
Figure 8:
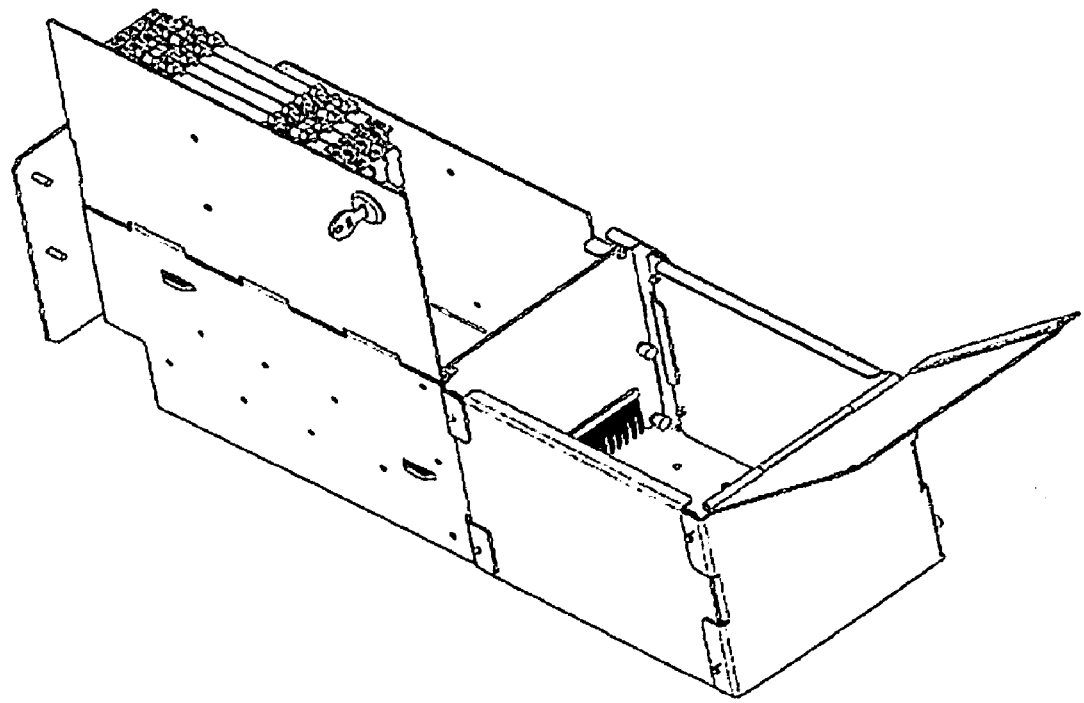
FIG. 8—the lower surface of the modular separating box with a sending chamber in a first implementation example with the cover of the light guide cables.

In the first implementation example the shape and dimensions of the modular separating box with a receiving chamber or sending chamber are identical.

The modular separating box has a perpendicular-walled shape and contains a housing 2 with chambers, a bracket 3 of the panel 4 of adapters 5 with four rows of exchangeable panels 4 having 12 adapters 5 each, rotatably fastened doors 8 closed with a lock 7, to which a cassette 9 is fastened from the inside; it also contains a cable guide 10 (for pigtails) and a short front door 6, blocked by door 8. The side wall 1, which is removable to assure easy access of the preconnected cable, is connected to the bent side edges of the upper and lower part of the housing 2 with the aid of connector elements. The bracket 3 of the panel 4 of adapters 5 with the axis of rotation along the rear edge of the pitch plane of the housing on the chamber is located between the upper and lower part of the housing 2 in the pitch plane of the housing on two chambers parallel to the side wall 1. It is possible in this implementation to replace the bracket 3 of panel 4 of adapters 5 with the cover of the light guide cable 11.

The lower part of the housing of the sending or receiving chamber is connected with the aid of hinges to the doors 8 along the front lower edge of this part of the housing. The cassette 9 is placed on the inner surface of the door 8, and the lock 7 is seated in the upper right-hand corner. In addition, the box has two short front doors 6 connected to the housing with the aid of hinges along the side edge of the housing, and along the upper and lower edges adjoining the short front doors 6, there are bent borders for connection to the successive element with the aid of connector elements. The short front doors 6 have a strip along their edge that permits blocking these doors, where the receiving box has a strip fastened along the left-side edge and for the sending box along the upper edge of the short front doors 6. The walls 13 are removable; a common space is thus created for the pigtails. The removable walls 13 are fastened to the configured side edges of the upper and lower parts of the housing 2 for the pitch plane on the chamber with clips 12. Catches for connecting the individual modular boxes are located on the upper and lower surfaces of the housing 2.

Figure 9:
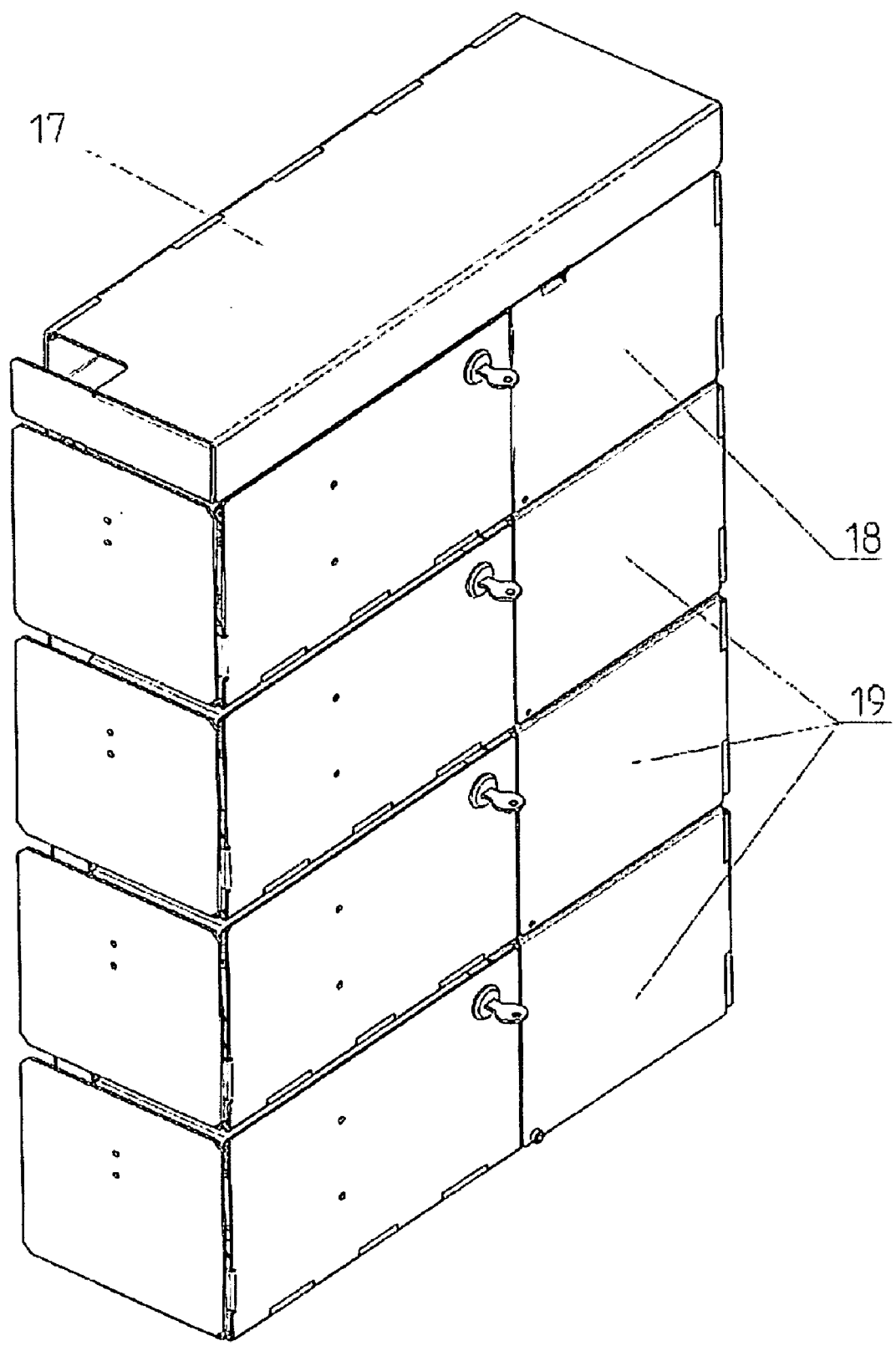
FIG. 9—closed modular separating box with a receiving chamber connected to three modular separating boxes with sending chambers in a first implementation example with a separate space for storing the light guide cables.
Figure 10:
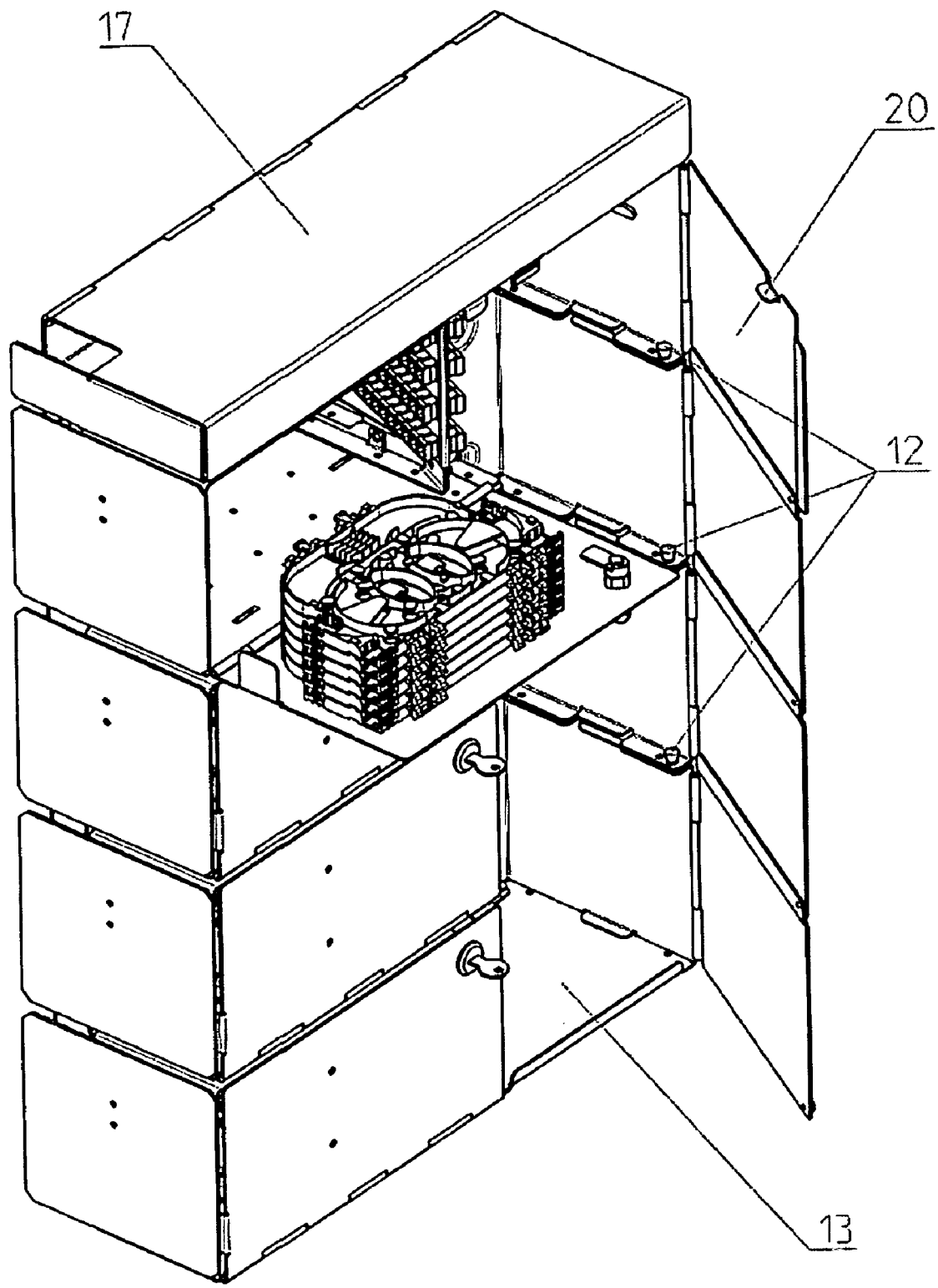
FIG. 10—modular separating box with a receiving chamber connected to three modular separating boxes with sending chambers in a first implementation example with open doors of the receiving chamber and the connection chamber.
Figure 11:
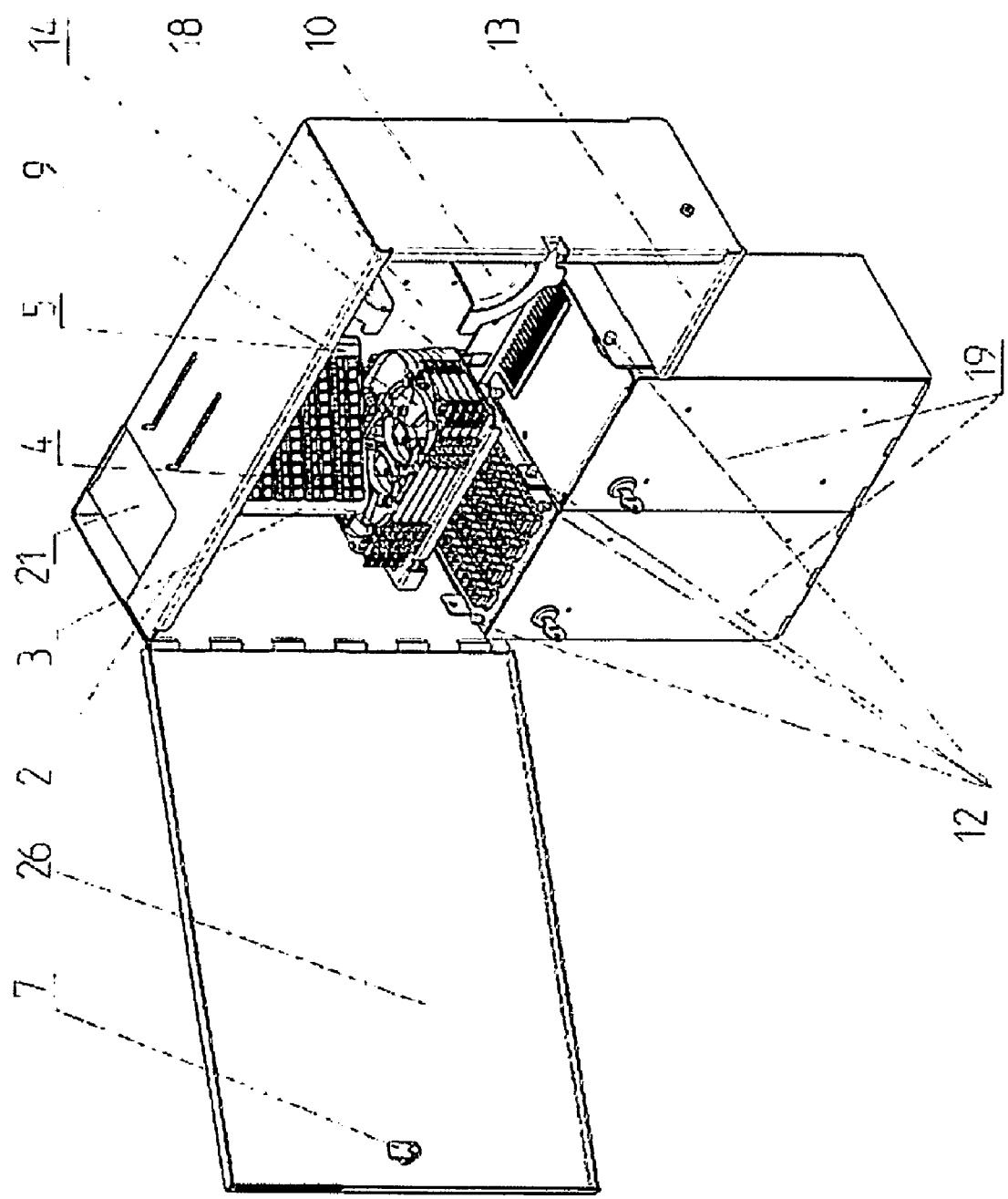
FIG. 11—modular separating box with a receiving chamber with open doors connected to two modular separating boxes with sending chambers in a second implementation example.
Figure 12:
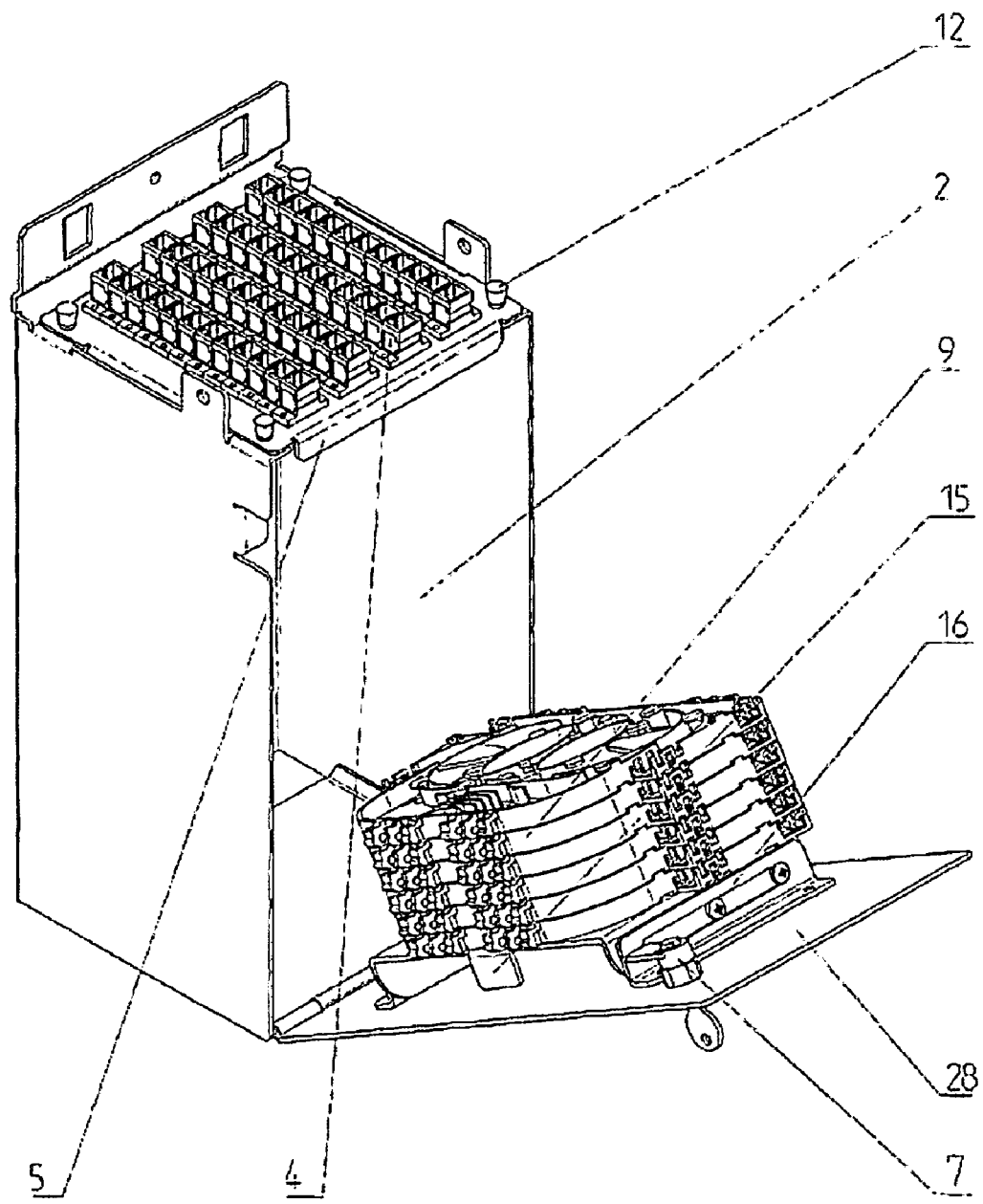
FIG. 12—the inside of the modular separating box with receiving/sending chamber in a second implementation example with a panel bracket.
Figure 13:
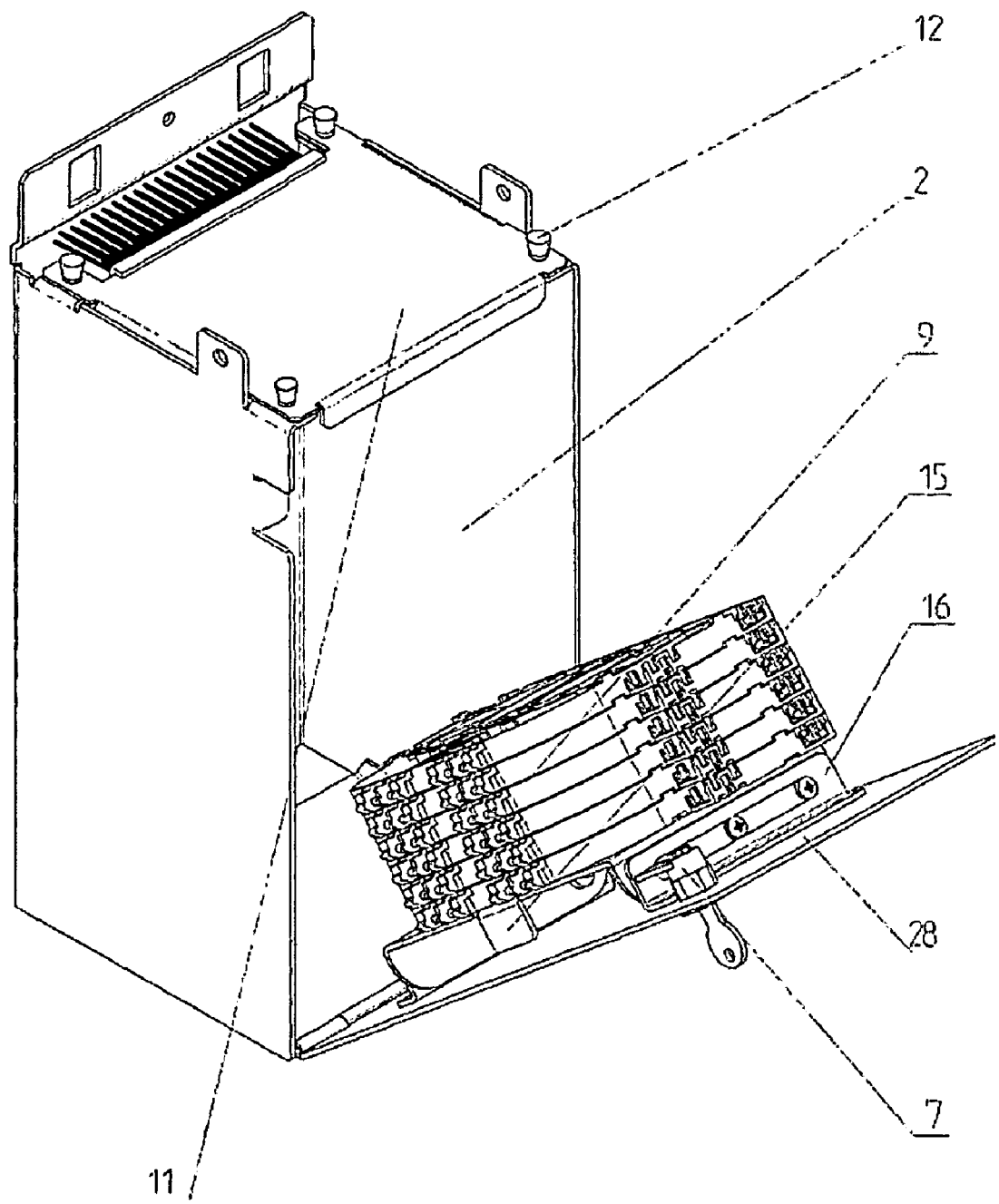
FIG. 13—modular separating box with receiving/sending chamber in a second implementation example with the cover of the light guide cables.

It is possible to connect individual boxes by using the invention. In one of the solution variants, three modular separating boxes with sending chambers are connected to the modular separating box with a receiving chamber, as shown in FIG. 10. As a result of the connection, a perpendicular-walled solid unit having the width and depth of the individual box was formed, and its height is a multiple of the height of the individual boxes. There is a shelf 17 on the plane of the upper housing 2 for the light guide cable; it has a width and length that match the corresponding dimensions of the modular separating box, and its height is about one-fourth the height of the modular separating box. In the upper left-hand corner of the shelf 17, there is a cutout through which the preconnected cable goes inside. The cover of the shelf 17 is connected to the shelf 17 by hinges along its upper rear edge. The modular separating boxes have profiled upper and lower edges for connecting the individual modular separating boxes to each other by means of clips 12. The doors 20 comprised of the coupling of the smaller elements 6 do not have locks. In order to obtain access to the space located on the right-hand side (or the space for handling the pigtails), it is necessary to open the modular separating box with the receiving chamber, which blocks the right-hand door. FIG. 9 shows a modular separating box with a receiving chamber 18 connected with the modular separating boxes with sending chambers 19 with closed doors of the modular separating box with the receiving chamber 18 and closed doors of the modular separating boxes with sending chambers 19.

In a second implementation example the modular separating box with a receiving chamber 18 and the modular separating box with a sending chamber 19 are modular separating boxes having a perpendicular-walled form but differ in dimensions. The width of the modular separating box with the receiving chamber 18 is a multiple of the width of the modular separating box with the sending chamber 19, and the modular separating box with the receiving chamber 18 in this implementation example is connected to two modular separating boxes with sending chambers 19, while the third part of the lower wall of the modular separating box with the receiving chamber 18 constitutes the removable wall 13. In addition, the modular separating box with the receiving chamber 18 has front doors 26 fastened by hinges to the housing, enclosed by the lock 7, and inside of it, one part contains a bracket 3 with panels 4 of adapters 5 having a rotation axis and cassette 9 on the bracket of cassettes 14, and the second part has a free space for braiding pigtails. On the upper surface of the modular separating box with receiving chamber 18, there is a gate 21 that facilitates introduction of the preconnectorized cable. The modular separating box with sending chamber 19 has a perpendicular-walled shape having doors 28 with a cassette 9 located on them from the inside in a drawer 15 situated on the guide of the drawer 16. A lock 7 is seated in the doors 28 in their left-hand upper corner. The upper wall of the modular separating box with the sending chamber 19 constitutes the bracket 3 of the panel 4 of adapters 5 or the cover 11 of the light guide cable.

The modular separating boxes with the sending chambers have fastening projections or lugs along the upper edges that facilitate fastening the individual elements to each other.

The solution according to the invention makes it possible to use one modular separating box for light guides, utilized by several different operators, facilitating each operator having sole access to a separate modular separating box, and access with other operators to a common modular separating box.

What is claimed is:

1. A modular separating box for light guides, comprising:
    a housing comprising at least one of a receiving chamber, a sending chamber, and a connection chamber, wherein each one of the receiving chamber, the sending chamber and the connection chamber is enclosed by a separate door, and wherein the housing has at least one wall for connecting the housing to another housing and having at least one movable plate;
    at least one connection panel, wherein the at least one connection panel forms a wall of at least one of the receiving chamber and sending chamber; and
    fastening elements for connecting one modular separating box to successive modular separating boxes for creating a modular arrangement of separating boxes, wherein the fastening elements are located on at least one of an upper surface, lower surface and side surface of the housing.

2. The modular separating box according to claim 1, wherein the housing is perpendicular-walled.

3. The modular separating box according to claim 1, wherein the movable plate is a removable plate.

4. The modular separating box according to claim 1, wherein the movable plate is at least one of a lower wall, an upper wall, and a side wall.

5. The modular separating box according to claim 1, wherein the connection panel comprises a bracket and a panel of adapters.

6. The modular separating box according to claim 1, wherein the connection panel comprises a cover of a light guide cable.

7. The modular separating box according to claim 1, wherein the connection panel constitutes an outside wall of the modular separating box.

8. The modular separating box according to claim 1, wherein the connection panel constitutes a pitch plane on the at least one of the sending chamber, the receiving chamber, and the connection chamber.

9. The modular separating box according to claim 1, wherein the connection panel is connected rotatably to a rear wall of the housing.

10. The modular separating box according to claim 1, wherein at least one of the receiving chamber and the connection chamber is connected to at least one sending chamber.

11. The modular separating box according to claim 1, wherein the connection chamber constitutes part or all of the receiving chamber.

12. The modular separating box according to claim 1, wherein the doors are connected in an articulated manner to the receiving chamber and the sending chamber.

13. The modular separating box according to claim 1, wherein the doors have edges, and wherein the edges have margins with connecting elements that permit creation of a common surface.

14. A system of modular separating boxes for light guides, comprising:
    a set of interconnected modular separating boxes, each of the set of modular separating boxes comprising:
        at least one of a sending chamber, a receiving chamber, and a connection chamber; at least one movable wall for further connections to other modular separating boxes, and including at least one movable plate;
        at least one connection panel, attached to the at least one of the receiving chamber and sending chamber; and
        fastening elements located on a surface of at least one of the plurality of interconnected modular separating boxes, wherein the fastening elements are operable to connect modular separating boxes to successive modular separating boxes for creating a modular arrangement of separating boxes, and
    wherein the system comprises at least one sending chamber and at least one receiving and/or connection chamber.

15. The system according to claim 14, wherein the system comprises at least one sending chamber and at least one receiving chamber.

16. The system according to claim 14, wherein the sending chambers are located inside and/or below and/or above and/or around the receiving chamber.

17. The system according to claim 14, wherein the connection chamber constitutes part or all of the receiving chamber.

18. The system according to claim 14, further comprising a separate space for storing light guide cables.

* * * * *